Sept. 8, 1964

W. H. LEWIS 3,147,678

PAVEMENT FINISHER

Original Filed July 22, 1957

INVENTOR.
WILLIAM H. LEWIS
BY Fulwider Mattingly & Huntley
Attorneys

Sept. 8, 1964  W. H. LEWIS  3,147,678
PAVEMENT FINISHER
Original Filed July 22, 1957  6 Sheets-Sheet 2
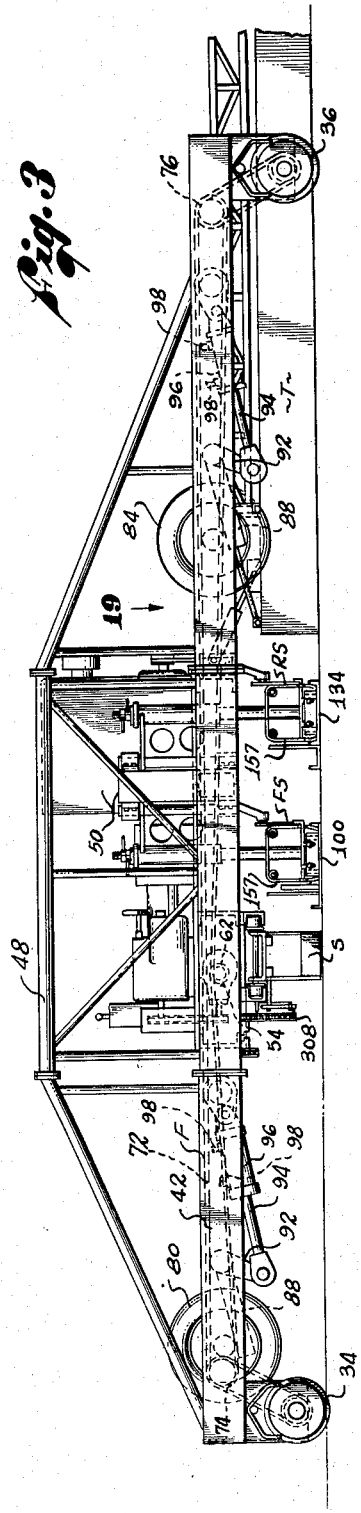
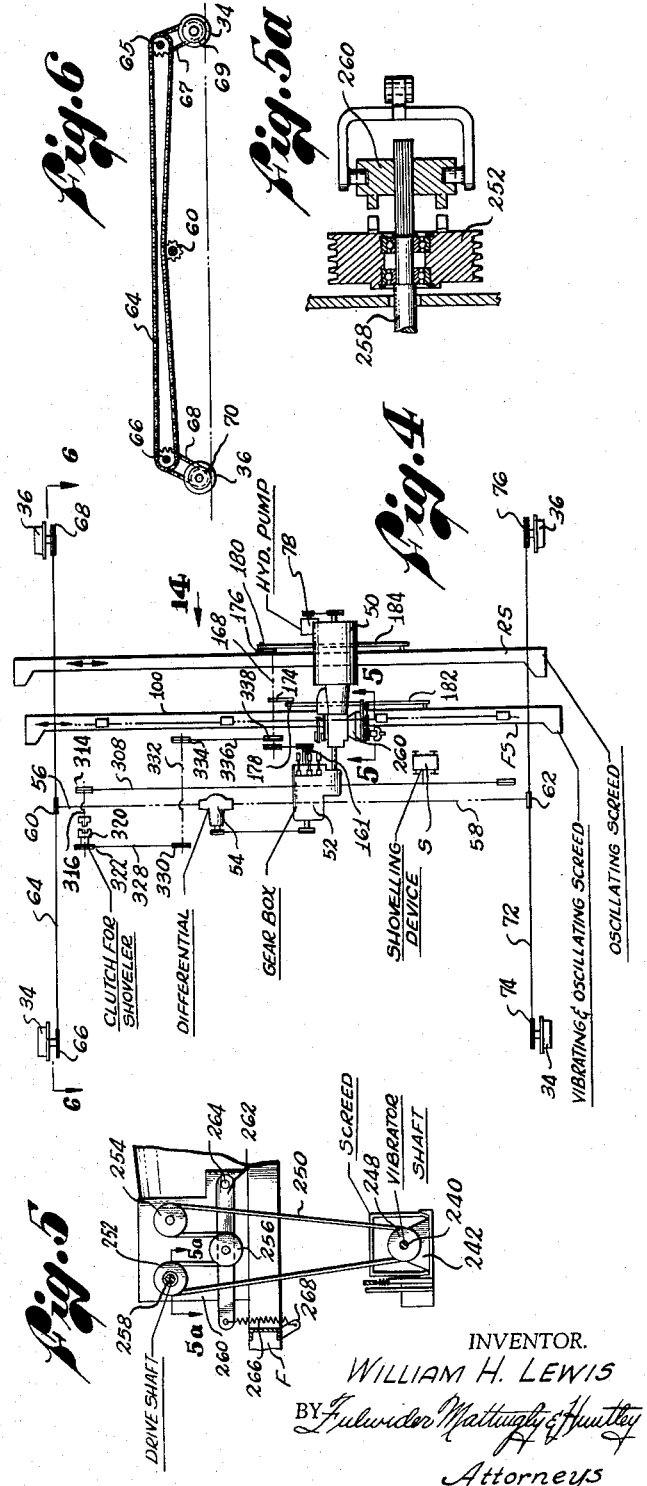
INVENTOR.
WILLIAM H. LEWIS
BY Fulwider Mattingly & Huntley
Attorneys Sept. 8, 1964     W. H. LEWIS     3,147,678
PAVEMENT FINISHER
Original Filed July 22, 1957     6 Sheets-Sheet 3
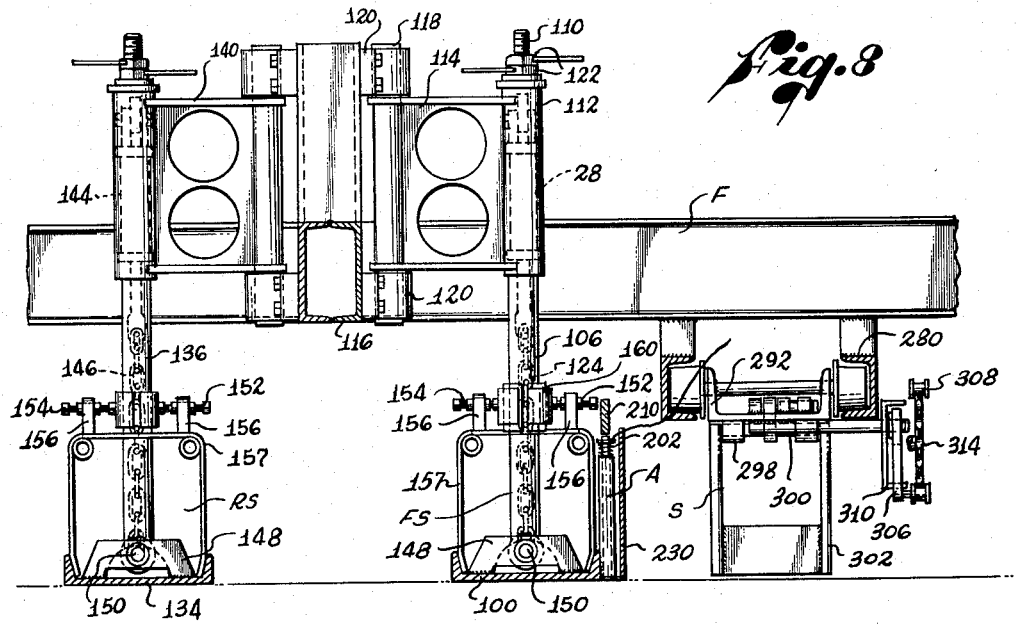
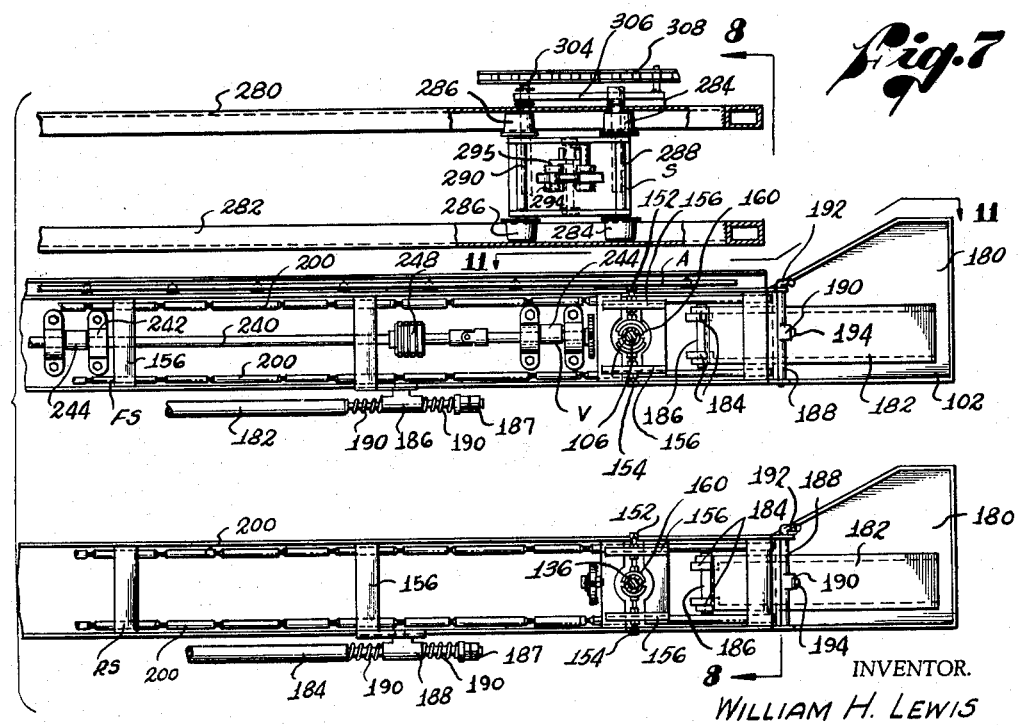
INVENTOR.
WILLIAM H. LEWIS Sept. 8, 1964 W. H. LEWIS 3,147,678
PAVEMENT FINISHER
Original Filed July 22, 1957 6 Sheets-Sheet 4

INVENTOR.
WILLIAM H. LEWIS
BY
Attorneys

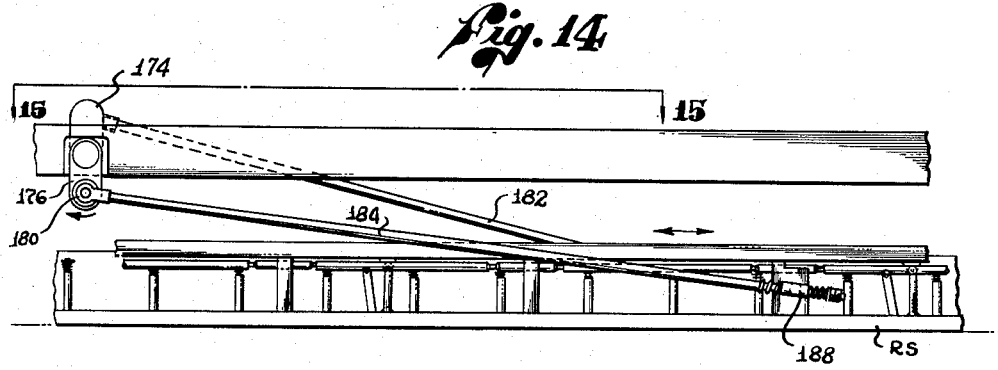
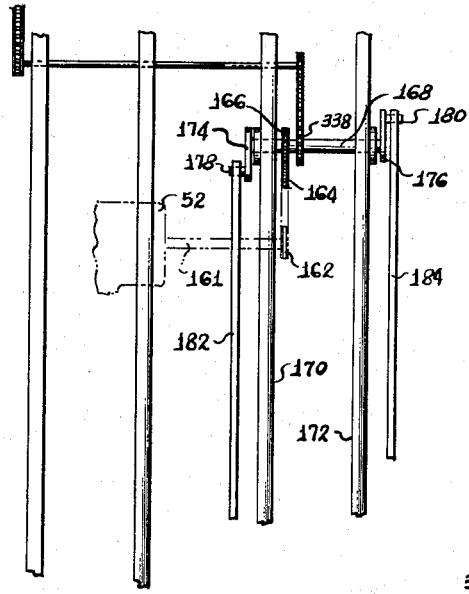
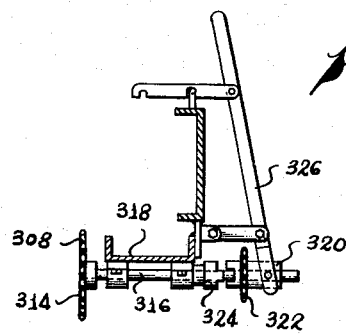

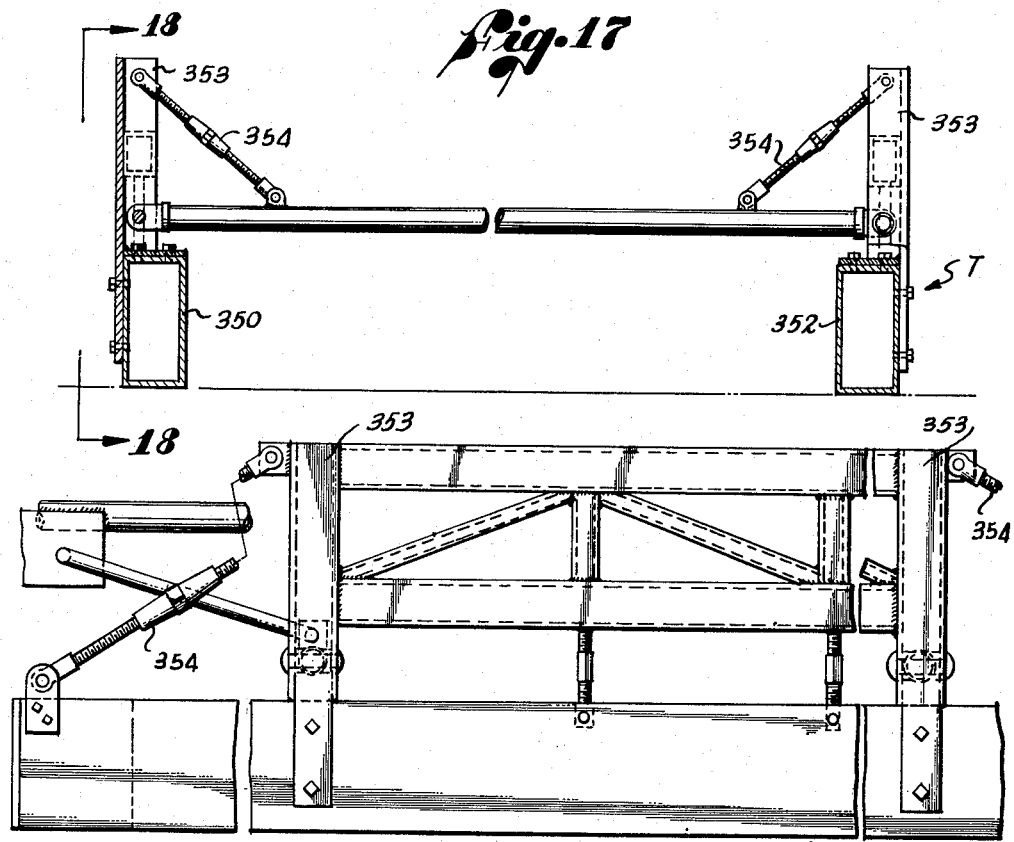
Fig. 17
Fig. 18
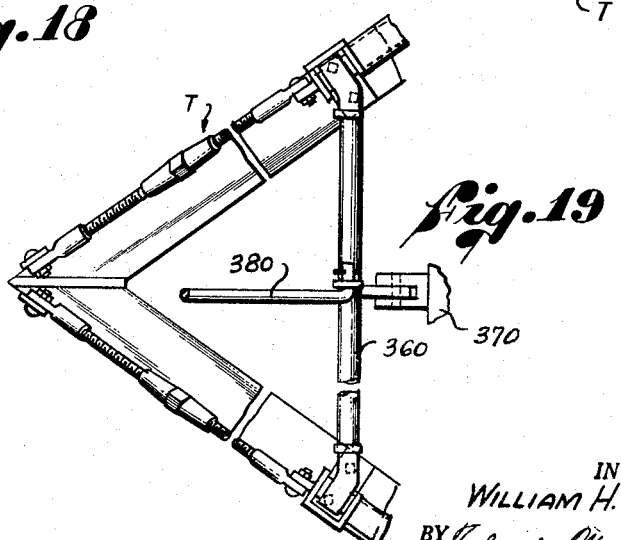
Fig. 19
INVENTOR.
WILLIAM H. LEWIS 3,147,678
PAVEMENT FINISHER
William H. Lewis, 9530 E. Rush St., El Monte, Calif.
Continuation of application Ser. No. 673,450, July 22, 1957. This application Aug. 29, 1962, Ser. No. 224,271
16 Claims. (Cl. 94—45)

The present invention relates generally to the field of road building and more particularly to a novel and improved pavement finisher.

When concrete roads, airport runways and other flat concrete surfaces are laid, it is common to form the lanes or sections of the surface in separate parallel lengths. The sides of each lane or section are initially defined by a pair of parallel steel side form members between which the paving material is poured. Each side form rests upon the ground and is formed at its upper end with a so-called "tread." The latter receives the wheels of the various paving, surface finishing and other machines which travel along the side forms during the preparation of the pavement. The side forms are generally made up of a large number of comparatively short lengths, a common length being 10 feet. Inasmuch as the ground upon which the side forms are laid may not be exactly level, the individual lengths of side forms will likewise not be perfectly level. The heretofore-proposed surface finishing machines for the paving material, however, tend to work the surface of the paving material to the same level as the tops of the side forms. Accordingly, it often occurs that the finished surface of the paving material is not in fact level.

It is a major object of the present invention to provide a pavement finisher capable of working a paved surface to an exact level, even though the side forms between which the pavement is laid are not exactly level.

It is a more particular object of the present invention to provide an improved pavement finisher having a pair of screeds which undergo concurrent horizontal reciprocation in opposite directions. These screeds are suspended from the intermediate portion of a comparatively long frame having front and rear wheels which ride upon the side forms. Forwardly of these screeds the frame supports a unique transverse shoveling device which distributes paving material across the front of the screeds. Rearwardly of the screeds the frame supports a transagular float that acts as straight edge to impart a smooth finish to the concrete surface which has previously been leveled by the oppositely reciprocating screeds. Rearwardly of the transangular float the frame supports a burlap drag attachment which is selectively engageable with the surface of the concrete, as during the final pass made by the finisher.

It is another object of the invention to provide a novel vibrating attachment for the horizontally reciprocating screed of a pavement finisher.

An additional object is to provide a novel agitator attachment for the horizontally reciprocating screed of a pavement finisher.

A further object is to provide a novel transverse shoveling device for use with a pavement finisher.

A particular object of the invention is to provide a pavement finisher having screed means suspended from a comparatively long wheeled frame rather than being supported at its ends by the side forms in the manner of heretofore-proposed pavement finishers.

It is yet another object to provide a suspended screed arrangement for a pavement finisher wherein the screed is provided with hinged end portions that ride upon the side forms. These end portions may be selectively locked relative to the main body of the screeds so as to permit the screed to be supported by the side forms while working on extreme grade changes.

It is yet a further object of the invention to provide a pavement finisher having normally retracted road wheels which may be hydraulically extended when it is desired to move the finisher into and out of operative position relative to the pavement to be worked.

A further object is to provide a pavement finisher of the aforedescribed nature which may be self-propelled along a pair of conventional side form members.

An additional object of the invention is to provide a pavement finisher of the aforedescribed nature which is simple of design and rugged of construction whereby it may provide a long and trouble-free service life.

Yet a further object is to provide a pavement finisher which is foolproof in operation and which does not require the services of a skilled and experienced operator.

These and other objects and advantages of the present invention will become more apparent from the following detailed description of a preferred embodiment thereof, when taken in conjunction with the appended drawings wherein:

FIGURE 3 is a side elevational view of said finisher;

FIGURE 4 is a top diagrammatic view showing the relative positions of the various members of said finisher;

FIGURE 5 is an enlarged vertical sectional view taken on line 5—5 of FIGURE 4;

FIGURE 5a is a further enlarged horizontal sectional view taken on line 5a—5a of FIGURE 5;

FIGURE 6 is a vertical sectional view taken on line 6—6 of FIGURE 4 and showing the driving arrangement for the side form-supported wheels of said finisher;

FIGURE 7 is a fragmentary top plan view in enlarged scale of a pair of screeds employed with said finisher, together with a shoveling device disposed forwardly of said screeds;

FIGURE 8 is a vertical sectional view taken on line 8—8 of FIGURE 7;

FIGURE 14 is a fragmentary enlarged front view taken from the point designated 14 in FIGURE 4 and showing a screed vibrating mechanism embodied in said finisher;

FIGURE 15 is a fragmentary top plan view taken along line 15—15 of FIGURE 14;

FIGURE 16 is an enlarged vertical sectional view taken along line 16—16 of FIGURE 2;

FIGURE 17 is a vertical sectional view of the transangular float taken along line 17—17 of FIGURE 2 which view has been foreshortened in the interest of clarity;

FIGURE 18 is a vertical sectional view taken along line 18—18 of FIGURE 17, which view has been foreshortened in the interest of clarity; and FIGURE 19 is a fragmentary top plan view showing the front portion of said transangular float as viewed from the point designated 19 in FIGURE 3.

*General Arrangement*

Figure 1:
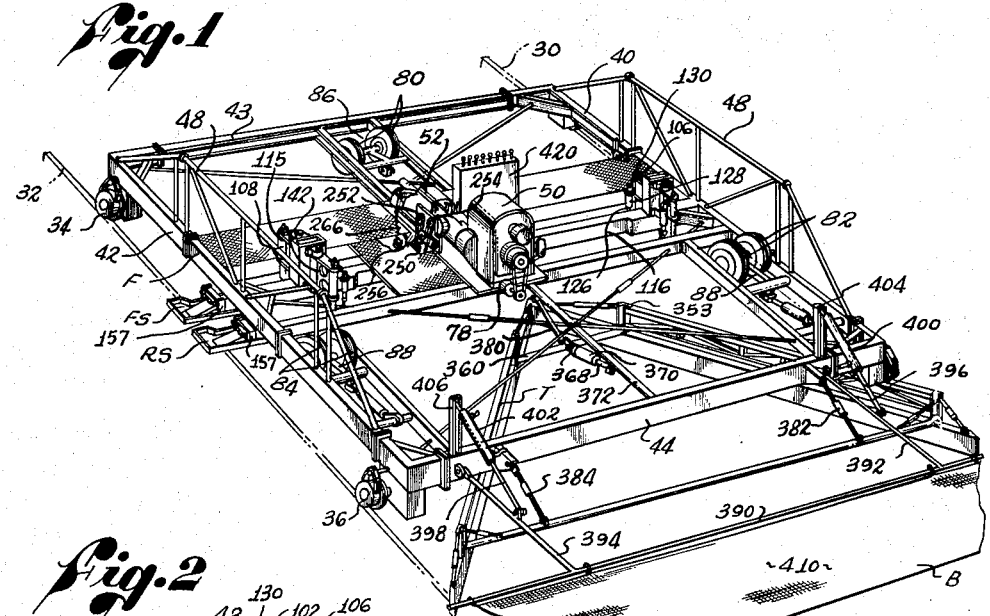
FIGURE 1 is a perspective view showing a preferred form of pavement finisher embodying the present invention.

Referring to the drawings and particularly FIGURES 1 to 4 thereof, the preferred form of pavement finisher embodying the present invention is adapted to be utilized in conjunction with a pair of steel side form members 30 and 32 between which paving material has previously been dumped by a conventional mechanical spreader (not shown). The pavement finisher includes a rigid frame F having supporting means such as a pair of front wheels 34 and a pair of rear wheels 36 for maintaining the frame above the pavement to be finished. The front and rear wheels are of flanged construction whereby they may ride upon the tops of the side forms, as indicated in FIGURE 1. The frame F carries a front screed FS and a rear screed RS at its intermediate portion. Forwardly of the two screeds FS and RS the frame carries a shoveling device S that undergoes transverse reciprocation across the frame so as to effect uniform distribution of the paving material between the side forms 30 and 32. Rearwardly of the screeds FS and RS and extending past the rear wheels 36 there is mounted a transangular float T that is generally V-shaped in plan form. The rear portion of the frame F supports a burlap drag attachment B. This attachment may be selectively raised or lowered relative to the pavement disposed between the side forms.

*The Frame F*

More particularly, the frame F includes a pair of side members 40 and 42 which are integrally connected by front and rear transverse cross-pieces 43 and 44, as well as various intermediate cross-pieces. The side members 40 and 42 are made up of a number of bolted-together sections, these sections being separate in order to facilitate shipping. Additionally, the transverse cross-pieces are removable bolted to the side members for this purpose. The side members may each be longitudinally braced by an upstanding framing structure 48, as shown in FIGURE 3.

An internal combustion engine 50 is centrally mounted on the frame F above the screeds FS and RS. As shown particularly in FIGURE 4, the engine 50 is coupled to a gear box 52. The gear box 52 is in turn coupled to a differential 54. The opposite sides of the differential 54 are keyed to a pair of shafts 56 and 58 having their opposite ends keyed to sprockets 60 and 62, respectively. The sprockets 60 and 62 are rotatably supported by the side frame members 40 and 42, respectively. Referring now to FIGURE 6, the sprocket 60 is engaged with the lower loop of an endless chain 64 disposed inwardly of the side frame member 40. This drive chain 64 encircles idler sprockets 65 and 66 which are journaled by the front and rear ends of the frame side member 40. Similar sprockets (not shown) are keyed to the supporting shafts of sprockets 65 and 66. The latter are each encircled by shorter chain loops 67 and 68. These chain loops 67 and 68 encircle driven sprockets 69 and 70, respectively, which are keyed to the shafts mounting the front and rear wheels 34 and 36 supported by the side frame member 40. Similarly, the sprocket 62 is meshed with a second endless chain 72 that encircles idler sprockets 74 and 76 which drive the front and rear wheels supported by the opposite side frame member 42. In this manner, the engine 50 is adapted to power the front and rear wheels 34 and 36 so as to effect movement of the pavement finisher along the side forms 30 and 32. The engine 50 is likewise adapted to effect reciprocatory movement of the front and rear screeds FS and RS, vibratory movement of the front screed, an agitator attachment for the front screed and transverse movement of the shoveling attachment S, as will be described hereinafter. This engine 50 is also coupled to a hydraulic pump 78, the operation of which will be fully described hereinafter.

The frame F is provided with a front pair of road wheels 80 and two pairs of side road wheels designated 82 and 84. The construction of each of these pairs of road wheels is substantially similar, with each of the pairs being carried at the opposite ends of a transverse axle 86. The midportion of this axle 86 is affixed to the free end of a pivot arm 88. The opposite end of each pivot arm 88 is affixed to the midportion of a transverse shaft 90 having its opposite end journaled by the frame F. A crank 90 interconnects each of the arms 88 with the free end of a reciprocating plunger element 94 extending from a hydraulic cylinder 96. The opposite end of each hydraulic cylinder 96 is connected to the hydraulic pump 78 by means of suitable flexible conduits 98. With this arrangement, the pairs of road wheels 80, 82 and 84 may be moved from their normal retracted position of FIGURES 1, 2 and 3 to an extended position (not shown) wherein they support the entire weight of the frame F. In moving from their retracted to their extended position the road wheels will lift the flanged wheels 34 and 36 from the side forms 30 and 32.

*The Front and Rear Screeds FS and RS*

Figure 11:
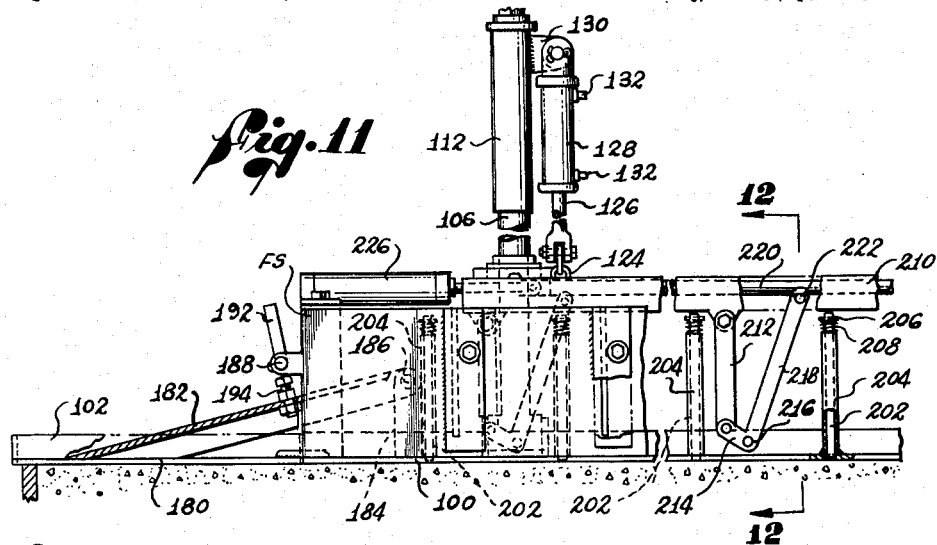
FIGURE 11 is a vertical sectional view taken on line 11—11 of FIGURE 7 and showing an agitator attachment for the front screed of said finisher.
Figure 12:
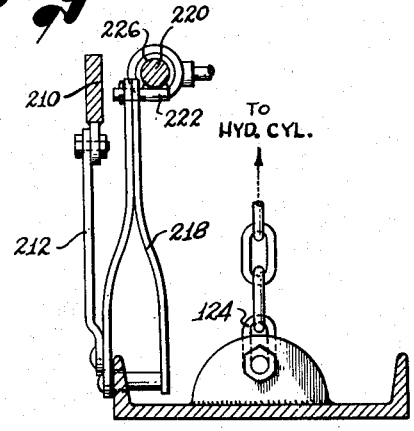
FIGURE 12 is an enlarged vertical sectional view taken on line 12—12 of FIGURE 11.
Figure 13:
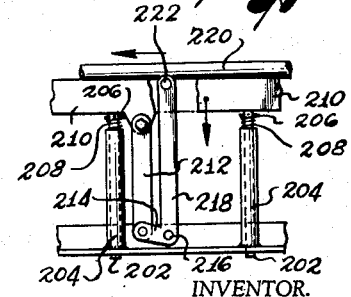
FIGURE 13 shows certain parts of said agitator attachment arranged in an operating position.

The details of construction of the front and rear screeds FS and RS are shown particularly in FIGURES 7 and 8. The front screed FS includes an elongated scraper element 100, the underside of which is adapted to ride upon the pavement surface being finished. The length of the scraper element 100 is somewhat less than the distance separating the side forms 30 and 32. The outer ends of the scraper element 100 are hingedly connected to a pair of shoes 102 and 104 which ride along the side forms 30 and 32. The outer portions of the scraper elements 100 are affixed to the lower end of a pair of upstanding posts 106 and 108. The upper ends of these posts 106 and 108 are formed with externally threaded elevation adjustment studs 110, as indicated particularly in FIGURE 8. The upper portions of the posts 106 and 108 are slidably received by sleeves 112 and 113, each formed at the free end of a pair of hinge elements 114 and 115, respectively. The opposite end of each of these hinged elements are pivotally affixed to a cross-piece 116 of the frame F. In this regard, as shown in FIGURE 8, the opposite end of the hinge element 114 is formed with a vertical pivot bar 118 disposed between a pair of strap bearings 120 secured to the frame cross-piece 116. A similar arrangement is provided for the other hinge element 115. The threaded stud 110 of each of the posts 106 and 108 extend through its respective tube 112 and 113 and receive a pair of nuts 122, as shown particularly in FIGURE 8. With this arrangement, the weight of the front screed FS will normally be supported by the hinge elements 114 and 115 at a height determined by the adjustment of the nuts 122. As indicated in FIGURES 8, 11 and 12, the scraper element 100 also mounts the lower end of a pair of chains 124, each disposed inwardly of one of the aforementioned posts 106 and 108. The upper end of these chains 124 are secured to the free end of a reciprocating plunger element 126 extending from a pair of hydraulic cylinders 128. As shown particularly in FIGURE 11, the upper end of the hydraulic cylinders 128 are each connected to a bracket 130 formed at the upper end of one of the sleeves 112 and 113. The hydraulic cylinders 128 are each connected to the hydraulic pump 78 by means of flexible conduits 132. With this arrangement, the front screed FS may be selectively raised and lowered relative to the frame F by the operator.

The rear screed RS is generally similar in construction to that of the front screed FS. In this regard, the rear screed RS includes a scraper element 134 identical to the scraper element 100 of the front screed FS. The outer ends of the scraper element 134 are pivotally affixed to a pair of shoes 103 and 105 which ride along the side forms 30 and 32 similarly to the shoes 102 and 104 of the front screed FS. The scraper element 134 is provided with a pair of posts 136 and 138 similar to the posts 106 and 108 of the front screed FS. The upper end of these posts 136 and 138 are connected to the free end of a pair of hinge elements 140 and 142 similar to the aforedescribed hinge elements 114 and 115. The rear screed RS may also be raised and lowered relative to the frame F by means of a pair of hydraulic cylinders 144, each affixed at its upper end to the free ends of the hinge elements 140 and 142 and having a reciprocating plunger connected to the outer portions of the scraper element 134 by a chain 146.

It is preferable that the lower end of the aforementioned posts 106, 108, 136 and 138 are pivotally secured to the scraper elements 100 and 134. Accordingly, as shown in FIGURE 8, the latter elements are provided with aligned pairs of upstanding brackets 148 having their midportions pivotally connected to the lower end of the posts by means of pivot pins 150. The relative angle between the scraper elements 100 and 134 and the posts are controlled by front and rear set screws 152 and 154, respectively, carried by the upper portions of a pair of adjustment brackets 156, these adjustment brackets being affixed to the upper legs of strap elements 157. The latter are of inverted U-shape having their lower ends rigidly secured to the front and rear of the scraper elements 100 and 134. The opposite ends of the adjustment screws 152 and 154 are connected to the opposite halves of a split collar 160 having its inwardly facing side walls engageable with the posts 106, 108, 136 and 138.

Figure 2:
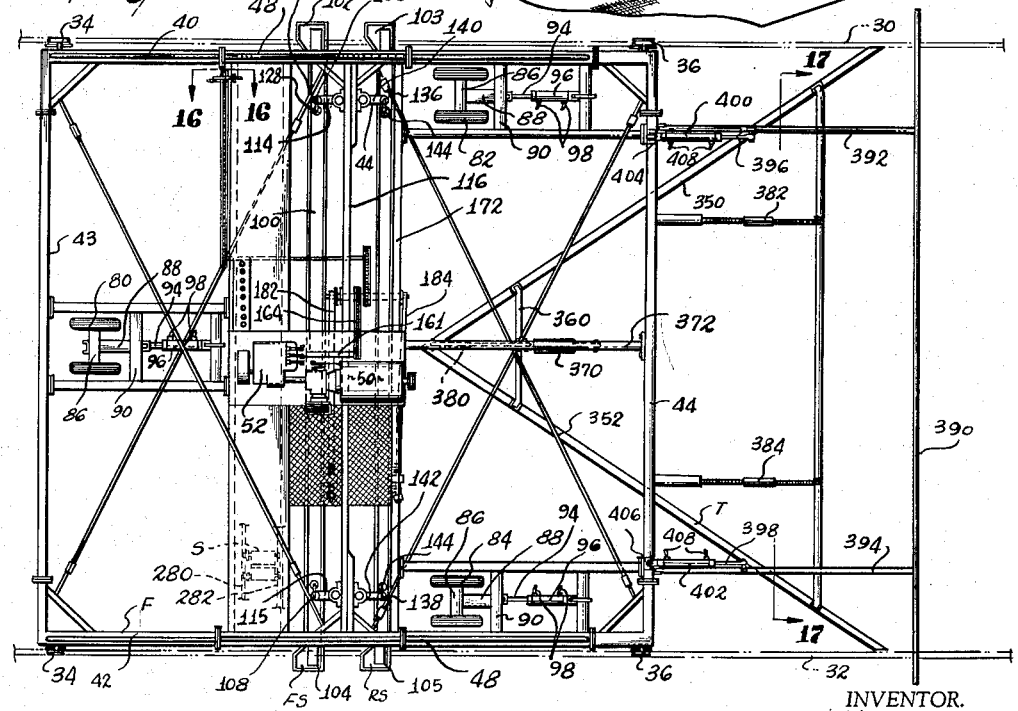
FIGURE 2 is a top plan view of said finisher.

As noted hereinbefore, the front and rear screeds are adapted to undergo concurrent horizontal reciprocation relative to the frame in opposite directions. This reciprocation is imparted to the screeds by the engine 50 through the aforedescribed gear box 52. Thus, referring to FIGURES 2, 4 and 15, a driving shaft 161 extending from the rear of the gear box 52 is keyed to a sprocket 162. This sprocket 162 is engaged with a chain 164 which encircles a driven sprocket 166. The latter sprocket 166 is keyed to a driven shaft 168 supported between adjoining crosspiece 170 and 172 of the frame F. The front end of the driven shaft 168 is keyed to a front crank 174 while the rear end is keyed to a rear crank 176. The free ends of the front and rear cranks 174 and 176 are formed with pins 178 and 180, respectively. These pins 178 and 180 are diametrically opposed relative to the driven shaft 168, as will be clear from FIGURE 15. The front pin 178 is pivotally connected to a front connecting rod 182 while the rear driving pin 180 is pivotally connected to a rear connecting rod 184, which pins extend generally horizontally from the driven shaft 168 towards the frame side member 42, as shown in FIGURE 2. The opposite ends of the connecting rods 182 and 184 are of reduced diameter and slidably extend through a pair of drive sleeves 186 and 188, respectively. These drive sleeves 186 and 188 are affixed to the rear side of the outer portion of the front and rear screeds, as will be clear from FIGURES 7 and 14. Nuts 187 are mounted upon the outermost ends of the connecting rods 182 and 184. A pair of coil compression springs 190 are carried by the outer portion of the connecting rods 182 and 184 at either side of the drive sleeves 186 and 188 so as to provide a resilient connection between these rods and their respective drive sleeves. With this arrangement, the engine 50 is adapted to effect concurrent horizontal reciprocation of the front and rear screeds in opposite directions.

Referring now to FIGURES 7 and 11, the construction of each of the screed shoes 102, 103, 104 and 105 is substantially identical. Each of these shoes includes a flat scraper element 180 that forms a continuation of the scraper elements 100 and 134. The outer portion of each scraper element, however, tapers forwardly in plan view, as will be clear from FIGURE 7. A pivot brace 182 extends upwardly and inwardly from the upper surface of each scraper element 180, this brace 182 being rigidly affixed to the upper surface of its respective scraper element. The upper end of each brace arm 182 is pivotally supported between a pair of upstanding ears 184 by a horizontal pivot pin 186. The ears 184 are rigidly joined at their lower ends to the scraper elements 100 and 134 of the front and rear screeds, respectively. With this arrangement, the shoe 102 can normally pivot upwardly from its position of FIGURE 11, in a clockwise direction relative to the scraper element of its respective screed. It should be particularly observed, however, that the shoe 102 can be locked against movement relative to the front screed FS by means of a toggle link 188. This toggle link 188 is journaled by the outer end of either screed and its midportion is formed with an abutment pad 190 while its front portion is formed with an operating handle 192. When the operating handle 192 is pivoted counter-clockwise relative to its position of FIGURE 11, its abutment pad 190 will engage a set screw 194 carried by the intermediate portion of the pivot brace 182 so as to lock the shoe 102 against upward pivotal movement relative to the scraper element of its respective screed.

With continued reference to FIGURE 7 and with additional reference to FIGURE 8, it should be noted that the strap elements 157 of the front and rear screeds have their front and rear upper corners interconnected by a plurality of transversely extending turnbuckles 200. Since the scraper elements 100 and 134 of the front and rear screeds are flexible it is possible to manipulate these turnbuckles 200 so as to impart a desired curvature to the front and rear screeds when viewed from the front. Accordingly, the scraper elements 100 and 134 may be arranged to any desired configuration necessitated by the crown of the pavement being finished.

*The Agitator Attachment of the Front Screed*

The agitator attachment A of the front screed FS is particularly disclosed in FIGURES 7, 8 and 11 through 13. This agitator attachment A includes a plurality of upstanding tooth elements 202 which are transversely spaced across the front of the front screed FS. These teeth 202 are vertically movable between their upper or retracted position of FIGURE 11 and their extended position of FIGURE 13. When so extended they will engage the upper surface of the concrete and effect the agitation thereof so as to reduce segregation of the course surface aggregates. In this manner more uniform surface textures can be obtained. Each of the teeth 202 is slidably arranged within an upstanding tube 204 having its lower end affixed to the forward portion of the scraper element 100. A washer 206 is affixed to the upper end of each tooth 202 and a coil compression spring 208 is interposed between the upper end of each tube 204 and the washer 206. The upper ends of each of the teeth 202 are in vertical alignment with a vertically movable presser bar 210. At transversely spaced points along its length the presser bar 210 is pivotally connected to the upper end of a link 212 as shown particularly in FIGURES 11 and 13. The lower end of the link 212 is pivotally connected to the free end of the shorter arm 214 of a generally L-shaped crank 216. The longer arm 218 of this crank has its free end pivotally connected to a rod 220 slidably carried by the upper end of the front screed FS by means of a pin 222. One end of this rod 220 is secured to a hydraulic cylinder 226 mounted at the top of one side of the front screed FS. This hydraulic cylinder 226 is connected to the hydraulic pump 78 by suitable fittings. Movement of the rod 220 between its position of FIGURES 11 and 13 will serve to effect downward movement of the presser bar 210. Such downward movement of the presser bar 210 will effect concurrent downward movement of the teeth 202 whereby they will be moved into their extended position of FIGURE 13. Forwardly of the agitator attachment A the front screed mounts a conventional strikeoff plate 230.

*The Vibrator Attachment of the Front Screed*

The front screed FS is also provided with a vibrator attachment generally designated V and adapted to impart a vibratory motion to the front screed when desired. This vibrator attachment V is shown particularly in FIGURES 5, 5a and 7, and includes a horizontal transverse shaft 240 which is journaled upon the scraper element 100 by a plurality of strap bearings 242. This shaft 240 is keyed to a plurality of generally cylindrical off-center weights 244. Rotation of the shaft 240 will thus effect concurrent rotation of these off-center weights 244 so as to impart vibratory motion to the scraper element 100. Rotation is imparted to the shaft 240 through a plurality of pulleys 248 keyed thereto at one side thereof. The pulleys 248 are encircled by a plurality of belts 250, which belts 250 also encircle a set of driving pulleys 252, a set of fixed idler pulleys 254 and a set of clutch pulleys 256. The driving pulleys 252 are keyed to a drive shaft 258. As shown particularly in FIGURE 5a, the end of this drive shaft 258 is splined to receive a dog-type clutch 260. The drive shaft 258 is coupled to the engine 50 through a power take-off unit 260 whereby it undergoes rotation concurrently with the drive shaft of the engine. The fixed idler pulleys 254 are rotatably affixed to one side of this take-off unit 260. The clutch pulleys 256 are journaled by the intermediate portion of a lever 262 having one end pivotally secured to the power take-off unit 260 by a pin 264. The free end of the lever 262 is constantly biased downwardly by a tension spring 266 having its opposite end secured to a bracket 268 of the frame F. With this arrangement, the tension of the belts 250 may be readily adjusted by changing the effective force of the spring 266.

*The Transverse Shoveling Device S*

The details of the transverse shoveling device S are shown particularly in FIGURES 7 through 10. This device is supported upon the frame F immediately forwardly of the front screed FS by a pair of transverse cross-pieces 280 and 282. As shown in FIGURE 8, the cross-pieces 280 and 282 are generally C-shaped in vertical cross-section so as to rotatably receive two pairs of rollers 284 and 286. These pairs of rollers 284 and 286 are keyed to opposite ends of axles 288 and 290, respectively. These axles 288 and 290 are mounted at the upper end of a carriage member 292. As shown particularly in FIGURES 9 and 10, the midportion of this carriage member 292 is formed with a pair of longitudinally extending tubes 294 and 296. Below these tubes and centrally thereof the carriage member 292 is formed with a sleeve 298. A pivot pin 300 extends through this sleeve 298 so as to pivotally connect the upper end of a shovel member 302 thereto. A longitudinally extending bar 304 is affixed to one side of the lower portion of the carriage 292. As shown particularly in FIGURES 7 and 8, this bar 304 projects forwardly of the front cross-piece 280 so as to pivotally support one end of a drive lever 306. The opposite end of this drive lever 306 is pivotally affixed to a looped chain 308 disposed forwardly of the cross-piece 280. A vertically extending guide 310 for the drive lever 306 is mounted at the side of the carriage member 292 opposite the bar 304.

The looped chain 308 is supported below the frame F by a plurality of rollers 312. Referring to FIGURES 15 and 16, the chain 308 encircles a drive sprocket 314 that is keyed to a shaft 316 journaled below a frame cross-piece 318. As indicated in FIGURE 16, the front portion of the shaft 316 carries a clutch sleeve 320 to which is keyed a sprocket 322. This clutch sleeve 320 is caused to mesh with a complementary driven clutch element 324 by a lever 326. The clutch sprocket 322 is encircled by a chain 328. As shown in FIGURE 4, this chain 328 encircles a sprocket 330 that is keyed to the front end of an idler shaft 332. The rear end of this idler shaft is keyed to a sprocket 334. This sprocket 334 is encircled by a chain 336, which chain encircles a second sprocket 338. This sprocket 338 is keyed to the afore-described shaft 161 extending from the rear of the gear box 52.

Figure 9:
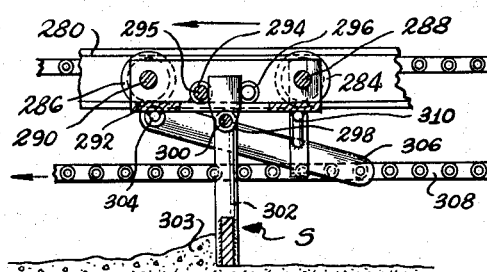
FIGURE 9 and FIGURE 10 are fragmentary rear views showing the operation of said shoveling device.
Figure 10:
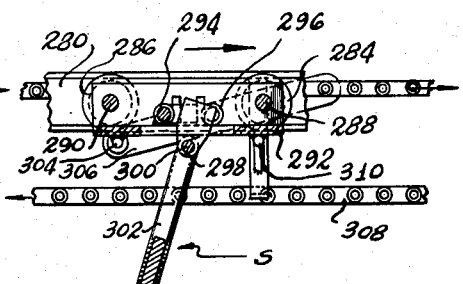

With this arrangement, the looped chain 308 will be caused to follow the path indicated in FIGURES 9 and 10, i.e. the upper bight will move towards the right relative to the frame F when viewed from the rear, while the lower bight moves towards the left. Since the free end of the drive lever 306 is pivotally affixed to the lower bight of the chain 308, it will pull the carriage member 292 to the left. Referring to FIGURE 9, it should be particularly noted that a pin 295 is disposed within the tube 294. This pin 295 abuts the adjacent upper end of the shovel member 302. Hence, the latter is locked against pivotal movement in a counter-clockwise direction away from its vertically extending position of FIGURE 9. The shovel member 302 will therefore spread the paving material 303 disposed adjacent its lower portion from right to left relative to the frame F.

Referring now to FIGURE 10, when the lower bight of the chain 308 reaches the left end of the frame F, it will reverse its direction and commence movement to the right. The drive lever 306 will meanwhile have rotated from its position of FIGURE 9 to that of FIGURE 10. Accordingly, the carriage member 292 will then be pulled towards the right side of the frame, as viewed from the rear. It should be particularly noted that the right-hand tube 296 does not contain a pin, such as the pin 295 disposed in the left-hand tube 294. The shovel member 302 will therefore be free to pivot clockwise away from the vertical as indicated in FIGURE 10. Accordingly, it will not spread paving material from left to right relative to the frame. The pin 295 may be shifted from tube 294 to tube 296 where it is desired to reverse the direction of pavement spreading.

*The Transangular Float T*

Referring now to FIGURES 1, 2, 3, 17, 18 and 19, the transangular float T is generally V-shaped in plan view with its pointed front end disposed rearwardly of the rear screed RS. The float member T includes a pair of straight beams 350 and 352. The rear ends of these beams 350 and 352 terminate slightly inwardly of the side forms 30 and 32. Preferably, the beam elements 350 and 352 are of metallic construction and are reinforced by a plurality of longitudinally spaced brace straps 353. brace straps are of inverted U-shaped with their lower ends rigidly affixed to the beams. The upper ends of the brace straps 353 are interconnected by longitudinally extending tie rods 354. These tie rods 354 may be adjusted so as to maintain the straightness of the beams. The front portions of the beams 350 and 352 are connected by a horizontal bar 360. The midportion of this bar 360 is pivotally connected to the rear end of a plunger element 368 that extends downwardly and forwardly from a hydraulic cylinder 370. The upper end of this hydraulic cylinder 370 is pivotally connected to a longitudinal brace 372 extending between transverse frame cross-pieces 44 and 172. Suitable flexible conduits 374 connect the hydraulic cylinder 370 with the hydraulic pump 78.

The intermediate portion of the bar 360 is also pivotally affixed to the lower end of a tension link 380 that extends forwardly and upwardly relative to the frame F. The upper end of this tension link 380 is pivotally connected to the frame cross-piece 172. The intermediate portions of the beams 350 and 352 are pivotally connected to the lower end of a pair of forwardly and upwardly extending tension links 382 and 384. The upper end of these tension links 382 and 384 are pivotally connected to outer portions of the rear frame cross-piece 44. A transverse bar 385 interconnects the beams adjacent the tension links 382 and 384. With this arrangement, the transangular float T can be raised relative to its lowered pavement engaging position of FIGURE 1 by retracting the plunger 368 within its hydraulic cylinder 370. Such movement of the plunger 368 will effect the rearward and upward swinging motion of the transangular float T.

The Burlap Drag Attachment B

Referring again to FIGURES 1 and 2, the burlap drag attachment B includes a transversely extending mounting bar 390 disposed rearwardly of the transangular float T. The outer portions of this mounting bar 390 are rigidly affixed to the rear ends of a pair of lifting rods 392 and 394. The front end of these lifting rods 392 and 394 are pivotally affixed to the rear of the rear frame cross-piece 44 outwardly of the tension links 382 and 384. The intermediate portion of these lifting rods are pivotally affixed to the lower end of a pair of reciprocating plungers 396 and 398, respectively, which extend from a pair of hydraulic cylinders 400 and 402. The upper end of these hydraulic cylinders 400 and 402 are pivotally affixed to the upper portion of a pair of upright braces 404 and 406, respectively, having their lower ends rigidly affixed to the rear frame cross-piece 44. Suitable flexible conduits 408 interconnect these hydraulic cylinders with the hydraulic pump 78. The mounting bar 390 is affixed to the front end of a burlap web 410. This burlap web 410 may be raised and lowered relative to the pavement surface being finished by means of the hydraulic cylinders 400 and 402.

Operation

In the operation of the aforedescribed pavement finisher the engine 50 will drive the side form-supported wheels 34 and 36 so as to move the finisher along the side forms. The shovel member 302 of the device S will spread the paving material from one of the side forms towards the opposite side form. The front screed FS then engages the wet paving material and tends to smooth its upper surface to the desired elevation. During this time, the teeth 202 of the agitator attachment A may be disposed in their extended position of FIGURE 13. Additionally, the vibrator attachment V may be operated if desired. Therefore, the rear screed will engage the paving material and tend to level its upper surface.

In this regard it should be particularly observed that the individual adjoining lengths of side forms may not be exactly level. If the shoe members 102, 103, 104 and 105 of the front and rear screeds were rigidly attached to the scraper elements 100 and 134 of the screeds and thus rode along the side forms 30 and 32, the screeds would tend to conform the upper surface of the concrete to the uneven level of the side forms. With the pavement finisher of the present invention, however, the shoes 102, 103, 104 and 105 are pivotally secured to the ends of the screeds, and accordingly, these shoe members may ride along the side forms while the scraper elements 100 and 134 remain suspended from the frame F at a true level through their connection thereto by means of the post 106 and the hinge elements 114, 115, 140 and 142. The frame F will always tend to remain at a true level since its wheel base is longer than the length of two adjoining sections of the side forms and the front and rear side form-supported wheels 34 and 36 will therefore always ride upon alternate side form sections. In actual practice, where the side form sections are approximately 10 feet in length, a pavement finisher having a wheel base of approximately 25 feet has proven to provide very satisfactory results. It should be particularly noted that the shoes 102, 103, 104 and 105 may be locked against upward pivotal movement relative to their scraper elements 100 and 134 by means of the toggle links 188. In general, it is desirable to lock the shoes relative to their scraper elements so as to permit the screeds to ride along the side forms whenever the pavement finisher is working on extreme grade changes.

After the front and rear screeds FS and RS have brought the upper surface of the pavement material to a substantially true level, the transangular float T will impart a smooth finish to this surface. In order to provide a further improved surface the burlap web 410 of the burlap drag attachment B may be engaged with the paving material. Generally, the burlap drag attachment is utilized only during the final pass made by the pavement finisher. In this regard two to five passes are commonly conducted in a complete pavement finishing operation.

From the foregoing description it will be seen that a pavement finisher embodying the present invention is capable of imparting a level and smooth finish to paving material. The various members of the pavement finisher are easily controllable by the single operator of the machine. In this regard each of the hydraulically actuated elements may be controlled by means of a console 420 disposed upon the frame F adjacent the engine 50. The road wheels 80, 82 and 84 may be easily extended to permit easy positioning of the pavement finisher relative to the side forms 30 and 32.

While there has been shown and described hereinbefore what is presently considered to be the preferred embodiment of the present invention, it will be apparent that various modifications and changes may be made thereto without departing from the spirit of the invention or the scope of the following claims.

This is a continuation of my co-pending patent application, Serial No. 673,450, filed July 22, 1957, and now abandoned.

I claim:

1. A pavement finisher, comprising: a frame; supporting means on said frame for maintaining said frame above the pavement to be finished; screed means supported by the intermediate portion of said frame and including a scraper element; power-operated means on said frame; drive means interconnecting said power-operated means and said screed means whereby the latter will undergo horizontal reciprocation relative to said frame; a strike-off plate on said screed forwardly of said scraper; a plurality of vertical tubes between said strike-off plate and said scraper; a tooth in each of said tubes; spring means interposed between said teeth and said tubes constantly biasing said teeth upwardly; and a presser bar carried by said screed above said teeth and movable downwardly thereagainst so as to overcome said springs and lower said teeth into a pavement-engaging position.

2. A pavement finisher, comprising: a frame; supporting means on said frame for maintaining said frame above the pavement to be finished; screed means supported by the intermediate portion of said frame and including a scraper element; power-operated means on said frame; drive means interconnecting said power-operated means and said screed means whereby the latter will undergo horizontal reciprocation relative to said frame; a strike-off plate on said screed forwardly of said scraper; a plurality of vertical tubes between said strike-off plate and said scraper; a tooth in each of said tubes; spring means interposed between said teeth and said tubes constantly biasing said teeth upwardly; a presser bar carried by said screed above said teeth and movable downwardly thereagainst so as to overcome said springs and lower said teeth into a pavement-engaging position; a shaft journaled by said scraper element; a plurality of off-center weights keyed to spaced points along said shaft; and means connecting said power-operated means to said shaft so as to impart rotation thereto.

3. A pavement finisher for use in finishing pavement laid between a pair of generally longitudinally extending side forms comprising: a frame; supporting means on said frame for maintaining said frame above the pavement to be finished; screened means supported at a predetermined elevation by the intermediate portion of said frame, said screed means including a transverse scraper element having a length smaller than the distance between said side forms; a pair of side form-engaging shoes, each shoe forming a transverse extension of an end of said scraper element; and connecting means pivotally securing the end of each of said shoes proximate said scraper element to the adjacent end of said scraper element whereby said shoes may ride along the upwardly-facing surfaces of said side forms undergoing pivotal movement about a horizontal axis of rotation relative to the ends of said scraper element and independently of the elevation of said scraper element.

4. A pavement finisher for use in finishing pavement laid between a pair of generally longitudinally extending side forms comprising: a frame; supporting means on said frame for maintaining said frame above the pavement to be finished; screed means supported at a predetermined elevation by the intermediate portion of said frame, said screed means including a transverse scraper element having a length smaller than the distance between said side forms; a pair of side form-engaging shoes, said shoes being disposed at the ends of said scraper element and extending over said side forms; connecting means movably securing each of said shoes to the adjacent end of said scraper element whereby said shoes may ride along the upper surfaces of said side forms with their outer ends free to undergo vertical movement relative to said scraper element; and selectively engageable lock means that lock said shoes against vertical movement relative to the ends of said scraper element.

5. A pavement finisher for use in finishing pavement laid between a pair of generally longitudinally extending side forms comprising: a frame; supporting means on said frame for maintaining said frame above the pavement to be finished; screed means supported at a predetermined elevation by the intermediate portion of said frame, said screed means including a transverse scraper element having a length smaller than the distance between said side forms; a pair of side form-engaging shoes, each shoe forming a transverse extension of the adjacent end of said scraper element and extending over said side forms; connecting means pivotally securing the end of each of said shoes proximate said scraper element to the adjacent end of said scraper element whereby said shoes may ride along the upwardly-facing surfaces of said side forms free to undergo pivotal movement about a horizontal axis of rotation relative to the ends of said scraper element; and selectively engageable lock means that lock said shoes against vertical movement relative to the ends of said scraper element.

6. A pavement finisher for use in finishing pavement laid between a pair of generally longitudinally extending side forms comprising: a frame; supporting means on said frame for maintaining said frame above the pavement to be finished; screed means supported by the intermediate portion of said frame, said screed means including a transverse scraper element having a length smaller than the distance between said side forms; a pair of side form-engaging shoes, each shoe forming a transverse extension of the adjacent end of said scraper element; connecting means pivotally securing the end of each of said shoes proximate said scraper element to the adjacent end of said scraper element whereby said shoes may ride along the upwardly-facing surfaces of said side forms undergoing pivotal movement about a horizontal axis of rotation relative to the ends of said scraper element and independently of the elevation of said scraper element; upstanding post means on said scraper element; hinge means secured to said frame and having their free ends connected to said posts whereby said screed means may undergo transverse reciprocation relative to said frame while being maintained at a predetermined elevation relative to said frame; and elevation adjustment means interposed between said posts and the free ends of said hinge means.

7. A pavement finisher for use with a pair of side form members, each of said side form members consisting of a plurality of longitudinally aligned sections of substantially uniform length, comprising: a longitudinally extending frame; a first set of frame supporting means on the front portion of said frame; a second set of frame supporting means on the rear portion of said frame, the longitudinal distance between said first and second sets of frame supporting means exceeding twice the length of an individual side form section; screed means suspended at a predetermined elevation from the intermediate portion of said frame, said screed means including a transverse scraper element having a length smaller than the distance between the side form members; a pair of side form-engaging shoes, each shoe forming a transverse extension of an adjacent end of said scraper element; and connecting means pivotally securing the end of each of said shoes proximate said scraper element to the adjacent end of said scraper element whereby said shoes may ride along the upwardly-facing surfaces of said side forms undergoing pivotal movement about a horizontal axis of rotation relative to the ends of said scraper element and independently of the elevation of said scraper element.

8. A pavement finisher for use with a pair of side form members, each of said side form members consisting of a plurality of longitudinally aligned sections of substantially uniform length, comprising: a longitudinally extending frame; a first set of frame supporting means on the front portion of said frame; a second set of frame supporting means on the rear portion of said frame; the longitudinal distance between said first and second sets of frame supporting means exceeding twice the length of an individual side form section; screed means suspended at a predetermined elevation from the intermediate portion of said frame, said screed means including a transverse scraper element having a length smaller than the distance between the side form members; a pair of side form-engaging shoes, one of said shoes being disposed at an adjacent end of said scraper element; connecting means movably securing each of said shoes to one end of said scraper element whereby said shoes may ride along the upwardly-facing surfaces of said side form members, with said shoes being free to undergo vertical movement relative to said side form members independently of the elevation of said scraper element; and selectively engageable lock means that lock said shoes against vertical movement relative to said scraper element.

9. A pavement finisher for use with a pair of side form members, each of said side form members consisting of a plurality of longitudinally aligned sections of substantially uniform length, comprising: a longitudinally extending frame; a first set of frame supporting means on the front portion of said frame; a second set of frame supporting means on the rear portion of said frame, the longitudinal distance between said first and second sets of frame supporting means exceeding twice the length of an individual side form section; screed means suspended at a predetermined elevation from the intermediate portion of said frame, said screed means including a transverse scraper element having a length smaller than the distance between the side form members; a pair of side form-engaging shoes, each shoe forming a transverse extension of an adjacent end of said scraper element; connecting means pivotally securing the end of each of said shoes proximate said scraper element to the adjacent end of said scraper element whereby said shoes may ride along the upwardly-facing surfaces of said side forms undergoing pivotal movement about a horizontal axis of rotation relative to the ends of said scraper element and independently of the elevation of said scraper element; and selectively engageable lock means that lock said shoes against vertical movement relative to said scraper element.

10. A pavement finisher, comprising: a frame; supporting means on said frame for maintaining said frame above the pavement to be finished; screed means supported by the intermediate portion of said frame and including a scraper element; power-operated means on said frame; drive means interconnecting said power-operated means and said screed means whereby the latter will undergo horizontal reciprocation relative to said frame; a strike-off plate on said screed forwardly of said scraper; a plurality of vertical tubes between said strike-off plate and said scraper; a tooth in each of said tubes; spring means interposed between said teeth and said tubes constantly biasing said teeth upwardly; a presser bar carried by said screed means above said teeth and movable downwardly thereagainst so as to overcome said springs and lower said teeth into a pavement-engaging position; and means interposed between said frame and said screed means to effect vibration of said screed means and hence of said teeth.

11. In a pavement finisher having a frame, a shoveling device, comprising: a carriage member; mean supporting said carriage member for movement across said frame in a plane transverse to the direction of movement of said pavement finisher; means on said frame for moving said carriage member across said frame in said plane; a shovel pivotally secured to said carriage member for swinging movement in said plane; a first tube secured to said carriage member adjacent one side of said shovel; a second tube affixed to said carriage member adjacent the opposite side of said carriage member; and a lock pin removably disposable in either said first tube or said second tube so as to lock said shovel against said swinging movement in one direction, said shovel being free to undergo swinging movement in the opposite direction, with the direction in which said swinging movement takes place being controlled by which of said first or second tubes receives said lock pin.

12. In a pavement finisher having a frame and power-operated means, a shoveling device, comprising: a carriage member; means supporting said carriage member for movement across said frame in a plane transverse to the direction of movement of said pavement finisher; an endless chain extending transversely across said frame and operatively connected to said power-operated means whereby it may undergo constant lineal movement about a looped path relative to said frame; a drive lever having one of its ends pivotally connected to said carriage member and its opposite end pivotally connected to a point on said chain whereby said carriage member will undergo transverse reciprocation across said frame during said lineal movement of said chain; a shovel pivotally secured to said carriage member for swinging movement in said plane; first and second tubes affixed to opposite sides of said carriage member; and a lock pin removably disposable in either said first tube or said second tube so as to lock said shovel against said swinging movement in one direction, said shovel being free to undergo swinging movement in the opposite direction, with the direction in which said swinging movement takes place being controlled by which of said first or second tubes receives said lock pin.

13. A pavement finisher, comprising: a frame; supporting means on said frame for maintaining said frame above the pavement to be finished; screed means supported by the intermediate portion of said frame and including a scraper element; power-operated means on said frame; drive means interconnecting said power-operated means and said screed means whereby the latter will undergo horizontal reciprocation relative to said frame; a plurality of teeth positioned along said screed means; means interposed between said frame and said teeth for vertically moving said teeth in unison between an upper retracted position above said pavement and a lower extended position, with said teeth when arranged in said extended position engaging and agitating the upper surface of the pavement; a shaft journaled by said scraper element; a plurality of off-center weights keyed to spaced points along said shaft; and means connecting said power-operated means to said shaft so as to impart rotation thereto.

14. A pavement finisher, comprising: a frame; supporting means on said frame for maintaining said frame above the pavement to be finished; screed means supported by the intermediate portion of said frame and including a scraper element; power-operated means on said frame; drive means interconnecting said power-operated means and said screed means whereby the latter will undergo horizontal reciprocation relative to said frame; a plurality of teeth positioned along said screed means; means interposed between said frame and said teeth for vertically moving said teeth in unison between an upper retracted position above said pavement and a lower extended position, with said teeth when arranged in said extended position engaging and agitating the upper surface of the pavement; and means interposed between said frame and said screed means to effect vibration of said screed means and hence of said teeth.

15. A pavement finisher, comprising: a frame; supporting means on said frame for maintaining said frame above the pavement to be finished; second means supported by the intermediate portion of said frame and including a scraper element; power-operated means on said frame; drive means interconnecting said power-operated means and said screed means whereby the latter will undergo horizontal reciprocation relative to said frame; a strike-off plate on said screed downwardly of said scraper; a plurality of vertical tubes between said strike-off plate and said scraper; a tooth in each of said tubes; means interposed between said screed means and said teeth to move said teeth vertically in unison between an upper retracted position above said pavement and a lower extended position, with said teeth when in said extended position engaging and agitating the surface of said pavement; and means interposed between said frame and said screed means to effect vibration of said screed means and hence of said teeth.

16. In a pavement finisher used with a pair of side forms, the combination of: a frame supported above said side forms; screed means supported by the intermediate portion of said frame and including a scraper element; power-operated means on said frame; drive means interconnecting said power-operated means and said screed means whereby the latter will undergo horizontal reciprocation relative to said frame; a plurality of teeth positioned along said screed means; means interposed between said frame and said teeth for vertically moving said teeth in unison between an upper retracted position above said pavement and a lower extended position, with said teeth when arranged in said extended position engaging and agitating the upper surface of the pavement; and means interposed between said frame and said screed means to effect vibration of said screed means and hence of said teeth.

References Cited in the file of this patent
UNITED STATES PATENTS

| Number | Name | Date |
|---|---|---|
| Re. 18,455 | Carr | May 10, 1932 |
| 1,265,499 | Parrish | May 7, 1918 |
| 1,306,353 | Reynolds | June 10, 1919 |
| 1,447,999 | Rathmell | Mar. 13, 1923 |
| 1,467,243 | Fitzgerald | Sept. 4, 1923 |
| 1,522,138 | Ord | Jan. 6, 1925 |
| 1,524,403 | Merwin | Jan. 27, 1925 |
| 1,943,076 | Jackson | Jan. 9, 1934 |
| 2,094,910 | Baily | Oct. 5, 1937 |
| 2,148,214 | Mall | Feb. 21, 1939 |
| 2,150,618 | Blackwell | Mar. 14, 1939 |
| 2,180,660 | Baily | Nov. 21, 1939 |
| 2,187,080 | Heltzel | Jan. 16, 1940 |
| 2,194,754 | Johnson | Mar. 26, 1940 |
| 2,219,246 | Jackson | Oct. 22, 1940 |
| 2,219,247 | Jackson | Oct. 22, 1940 |
| 2,306,124 | Jackson | Dec. 22, 1942 |
| 2,334,717 | Long | Nov. 23, 1943 |
| 2,426,703 | Millikin et al. | Sept. 2, 1947 |
| 2,542,979 | Barnes | Feb. 27, 1951 |
| 2,592,960 | Schulze | Apr. 15, 1952 |
| 2,603,132 | Miller | July 15, 1952 |